United States Patent Office 3,484,476
Patented Dec. 16, 1969

3,484,476
A-NOR STEROIDS
David Walter Rosenthal, New Brunswick, and Josef Fried, Princeton, N.J., assignors, by mesne assignments, to E. R. Squibb & Sons, Inc., New York, N.Y., a corporation of Delaware
No Drawing. Original application Sept. 13, 1963, Ser. No. 308,664, now Patent No. 3,336,338, dated Aug. 15, 1967. Divided and this application Sept. 15, 1966, Ser. No. 611,787
Int. Cl. C07c 69/52, 49/54; C07d 5/04
U.S. Cl. 260—468                5 Claims This application is a division of our application, Ser. No. 308,664, now U.S. Patent No. 3,336,338, filed Sept. 13, 1963.

This invention relates to and has for its objectives the provision of physiologically active steroids, methods for preparing the same and new intermediates useful in said preparation.

The final products of this invention can be represented by the formulae

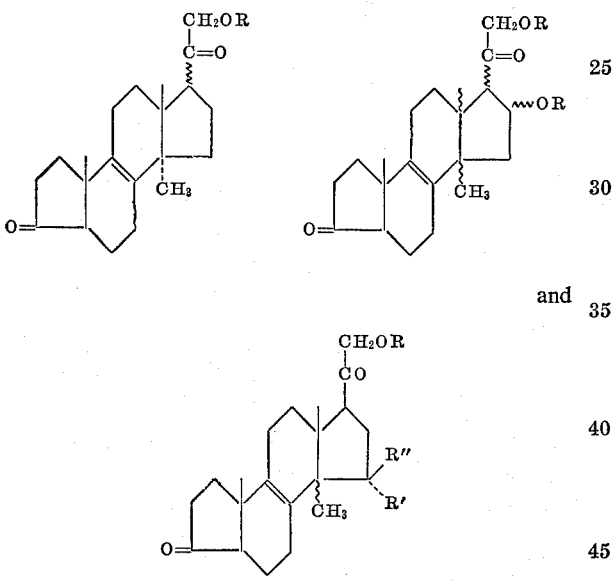

wherein R is hydrogen or acyl; R" is hydrogen R' is hydroxy or acyloxy and together R' and R" is oxo (O=).

The compounds of this invention are physiologically active steroids which possess anti-androgenic activity and thus can be employed in the treatment of such conditions as hyperandrogenic acne. The compounds may be formulated for such administration the concentration and/or dosage being based on the activity of the particular compound in the requirements of the patient.

The preferred acyl radicals are those of hydrocarbon carboxylic acids of less than 12 carbon atoms as exemplified by the lower alkanoic acids (e.g. acetic, propionic, butyric and tert.-pentanoic acids), the lower alkenoic acids, the monocyclic aryl carboxylic acids (e.g. benzoic and toluic acids), the monocyclic aryl lower alkanoic acids (e.g. phenacetic and β-phenylpropionic acids), the cycloalkane carboxylic and the cycloalkene carboxylic acids.

The final products of this invention are prepared by the process of this invention which entails a number of steps beginning with compounds of the following formulae as starting material:

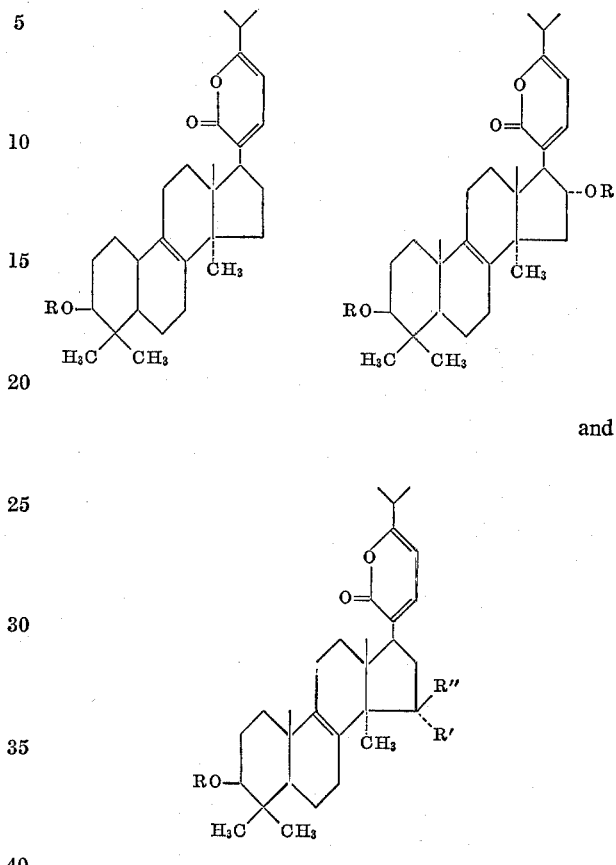

wherein R may be hydrogen or acyl, R" is hydrogen; R' is hydroxy or acyloxy, and together R' and R" is oxo (O=).

Among the starting materials which may be employed in the practice of this invention are those which may be prepared according to the procedures set forth in our copending applications, Ser. No. 212,154, filed July 24, 1962, now Patent No. 3,170,919 and Ser. No. 183,014, filed Mar. 28, 1962, now Patent No. 3,153,038 and which in turn is a continuation-in-part of our prior application, Ser. No. 132,310, filed Aug. 8, 1961, and now abandoned, and copending application Ser. No. 308,677 filed on even date herewith, now Patent No. 3,271,390 in the name of Josef Fried. The compounds which may be employed as starting materials include 3β - acetoxy - 24 - hydroxy-$\Delta^{8,20(22)23}$-lanostatriene - 21 - oic acid lactone (α-pyrone), 3β,16α - diacetoxy-24-hydoxy-$\Delta^{8,20,(22)23}$-lanostatriene 21 oic acid lactone, 3β,24-dihydroxy-$\Delta^{8,20(22)23}$-lanostatriene-21-oic acid lactone, 3β16α,24 - trihydroxy-$\Delta^{8,20(22)23}$-lanostatriene - 21 - oic acid lactone, 3β,15α-diacetoxy-24-hydroxy-$\Delta^{8,20(22)23}$-lanostatriene-21-oic acid lactone, 3β,15α,-24-trihydroxy-$\Delta^{8,20(22)23}$-lanostatriene-21-oic acid lactone, 3β - acetoxy-24-hydroxy-15-keto-$\Delta^{8,20(22)23}$-lanostatriene-21-oic acid lactone.

The steps of the process of this invention are generally represented by the following equations wherein R represents hydrogen or acyl; and Z represents COOH, COOCH₃ or CH₂OH:

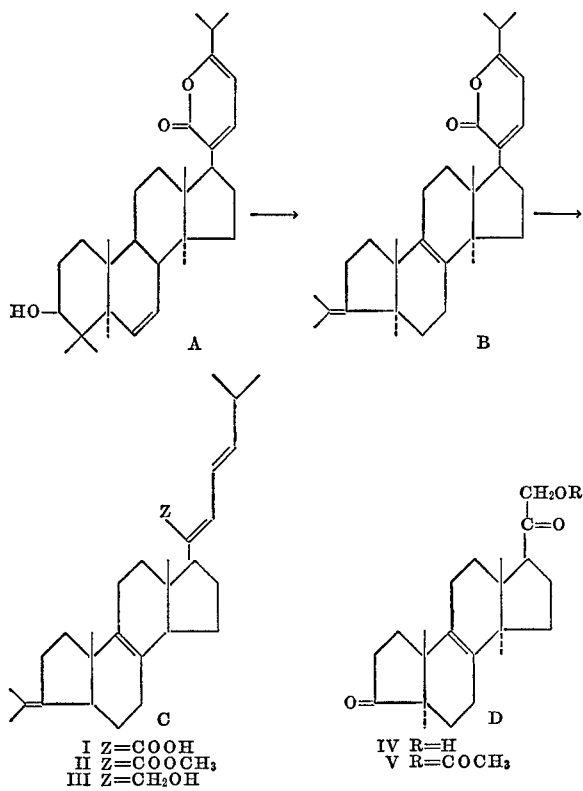

I  Z=COOH
II  Z=COOCH₃
III  Z=CH₂OH

IV  R=H
V  R=COCH₃

In the first step of the process of this invention, the 3β-hydroxy-Δ⁸-starting materials (Compounds A) enumerated hereinabove are reacted with phosphorous pentachloride to yield the 3-isopropylidene A-nor-Δ⁸-derivatives (Compounds B) which the new compounds of this invention.

Compounds B are then reduced as by treatment with a reducing agent such as lithium aluminum hydride, for an extended period of time, to yield the 3-isopropylidene-A-nor-Δ⁸-21-alkanol derivatives (Compounds C), which are also new compounds of this invention. To obtain the 3-isopropylidene-A-nor-Δ⁸-21-oic acid derivatives (Compounds C, wherein Z=COOH) which are also new compounds of this invention, the reduction is allowed to proceed for only a short time.

Compounds C are then ozonized as by treatment with ozone, to yield the 21-hydroxy-A-nor-Δ⁸-pregnene-3,20-dione (Compounds D) which are the final compounds of this invention.

The invention may be further illustrated by the following examples:

EXAMPLE 1

3β,24-dihydroxy-Δ$^{8,20(22),23}$-lanostatriene-21-oic acid 21→24-lactone (A)

3β - acetoxy-24-hydroxy-Δ$^{8,20(22),23}$-lanostatriene-21-oic acid 21→24-lactone (250 mg.) is suspended in 125 ml. methanol 0.7 M in KOH. The suspension is shaken at room temperature for fifteen hours. The product contains large prisms which are filtered off and crystallized from ethyl acetate to yield 35 mg. of pure pyrone-3-ol (A) (M.P. 262–264°). The filtrate is neutralized carefully to pH 7.2 with dilute sulfuric acid and concentrated. The concentrate is combined with the mother liquor from the first crystals and extracted with chloroform. The organic layer is washed with water, then dried over sodium sulfate and evaporated. Crystallization from acetone and from ethyl acetate gives several crops, which are combined to give 138 mg. of pure 3β,24-dihydroxy-Δ$^{8,20(22),23}$-lanostatriene-21-oic acid 21→24-lactone (A), M.P. 262–264°; $[\alpha]_D^{25}$—146° (c., 0.76 in CHCl₃);

$\lambda_{max.}^{alc.}$ 305 mμ ($\epsilon$=10,500); $\lambda_{max.}^{Nujol}$ 2.79, 5.86, 6.08, 6.31μ

*Analysis.*—Calcd. for C₃₀H₄₄O₃: C, 79.60; H, 9.80. Found: C, 79.50; H, 9.83.

EXAMPLE 2

3-isopropylidene-24-hydroxy-14-methyl-Δ$^{8,20(22),23}$-A-norcholestatriene-21-oic acid 21→24-lactone (B)

To a suspension of 3β,24-dihydroxy-Δ$^{8,20(22),23}$-lanostatriene-21-oic acid 21→24-lactone (A) (104 mg.) in 50 ml. of toluene which is cooled to 0–5° with ice, 108 mg. of phosphorus pentachloride is added and the flask covered with a dark cloth. Helium is then bubbled through the magnetically stirred solution as fast as it can be contained in the flask. Hydrochloric acid fumes are seen for the first five minutes in the effluent gas. The reaction is quenched after twelve minutes with excess 10% potassium carbonate solution and the organic phase is extracted three more times with this reagent. The organic phase is finally washed with saturated sodium chloride solution, dried over sodium sulfate, filtered and evaporated. Beautiful, fine needles of 3-isopropylidene - 24 - hydroxy-14-methyl-Δ$^{8,20(22),23}$-A-norcholestatriene-21-oic acid 21→24-lactone (B) separated from absolute ethanol yielding 78 mg., M.P. 182–185°; $[\alpha]_D^{23}$—105° (c., 0.51 in CHCl₃);

$\lambda_{max.}^{alc.}$ 305 mμ ($\epsilon$=10,300); $\lambda_{max.}^{Nujol}$ 5.78, 6.10, 6.33 and 9.08μ

*Analysis.*—Calcd. for C₃₀H₄₂O₂: C, 82.90; H, 9.74. Found: C, 83.20; H, 9.49.

EXAMPLE 3

3-isopropylidene-21-hydroxy-14-methyl-Δ$^{8,20(22),23}$-A-norcholestatriene (C. III)

A solution of 3-isopropylidene-24-hydroxy-14-methyl-Δ$^{8,20(22),23}$-A - nor - cholestatriene-21→24 - lactone (B) (M.P. 182–183°) in 5 ml. of freshly distilled tetrahydrofuran is added dropwise to a refluxing stirred suspension of lithium aluminum hydride in tetrahydrofuran over a five-minute period. The reaction is carried out under nitrogen. The reaction mixture is then heated under reflux for an additional hour and cooled and decomposed with ca. 1 ml. of saturated sodium sulfate solution. The resulting precipitate is filtered off and washed three times with benzene. The combined filtrates are dried over sodium sulfate and evaporated to give 102 mg. of a clear oil possessing $\lambda_{max.}^{alc.}$ 243 mμ ($E_{1cm.}^{1\%}$ 820)

The crude reaction product shows no carbonyl absorption bands and a strong peak at 7.35μ in the infrared. Thin layer chromatography shows the presence of at least two components. The crude material (45 mg.) is chromatographed on a thin layer of neutral alumina (activity V) and eluted with benzene. Elution of the least polar band ($R_f$=0.6) gives 10 mg. (M.P. 105–108°). Recrystallization from MeOH yields 6 mg. of pur 3-isopropylidene-21-hydroxy - 14-methyl-Δ$^{8,20(22),23}$-A-norcholestatriene (C; III) of the following properties: M.P. 112–113°;

$\lambda_{max.}^{Nujol}$ 3.00, 6.08, 6.20, 9.99μ

$[\alpha]_D^{23}$+48° (c., 1.43 in CHCl₃). Compound C, III, when crystallized from methanol forms a solvent (M.P.

78–80°) which on melting decomposes and reforms into crystals and melts again at 115–116°. Alternately, the higher melting point can be obtained directly by drying in high vacuum at ca. 50°.

Analysis.—Calcd. for $C_{30}H_{46}O$: C, 85.24; H, 10.97. Found: C, 85.32; H, 10.89.

EXAMPLE 4

3-isopropylidene-14-methyl-$\Delta^{8,20(22),23}$-A-norcholestatriene-21-oic acid (C; I)

A solution of 3 - isopropylidene - 24 - hydroxy - 14-methyl - $\Delta^{8,20(22),23}$ - A - norcholestatriene - 21 - oic acid→24-lactone (B) (106 mg.) in 2 ml. of tetrahydrofuran is added rapidly to a solution of 103 mg. of lithium aluminum hydride in 2 ml. of tetrahydrofuran. The mixture is refluxed for an additional three minutes, cooled to room temperature and worked up with saturated sodium sulfate solution and benzene, filtered and evaporated to dryness. The residue is chromatographed on five grams of activity V, Woelm neutral aluminum and the major fraction is eluated with 5% methanol in chloroform yielding 55 mg. of semicrystalline material melting at 165–170°. Two crystallizations furnishes pure 3-isopropylidene - 14 - methyl - A - norcholestatriene-21-oic acid (C; I) of the following properties: M.P. 169–170°; $[\alpha]_D^{23}+86°$ (c., 0.75 in $CHCl_3$);

$\lambda_{max.}^{alc.}$ 252 m$\mu$ ($\epsilon = 17,300$); $\lambda_{max.}^{Nujol}$ 3.85, 5.94, 5.98, 6.23 and 10.24$\mu$.

Analysis.—Calcd. for $C_{30}H_{44}O_2$: C, 82.51; H, 10.16. Found: C, 82.29; H, 9.88.

EXAMPLE 5

Methyl 3-isopropylidene-14-methyl-$\Delta^{8,20(22),23}$-A-norcholestatriene-21-oate 3-isopropylidene - 14 - methyl - $\Delta^{8,20(22),23}$ - A - norcholestatriene-21-oic acid is reacted with diazomethane in methanol-ether to yield methyl 3-isopropylidene-14-methyl-$\Delta^{8,20(22),23}$-A-norcholestatriene-21 - oate. After recrystallization from methanol the product has the following properties: M.P. 126–128°

$\lambda_{max.}^{alc.}$ 254 m$\mu$ ($\epsilon = 17,700$); $[\alpha]_D^{23}+77°$ (c., 1.04 in $CHCl_3$); $\lambda_{max.}^{Nujol}$ 5.86, 5.09, 6.21, 8.29, 10.19$\mu$ Analysis.—Calcd. for $C_{31}H_{46}O_2$: C, 82.61; H, 10.29. Found: C, 82.76; H, 10.39.

EXAMPLE 6

3-isopropylidene-21-hydroxy-14-methyl-$\Delta^{8,20(22),23}$-A-norcholestatriene The methyl 3-isopropylidene - 14 - methyl-$\Delta^{8,20(22),23}$-A-norcholestatriene-21-oate (104 mg.) is reduced with 15 mg. lithium aluminum anhydride in 50 ml. ether at room temperature for two hours. After decomposition with little water the mixture is filtered and the solvent evaporated to give 60 mg. of crystals (M.P. 68–70°) from methanol. The infrared spectrum of this material is identical with that obtained by reduction of the pyrone derivative (B).

EXAMPLE 7

14-methyl-$\Delta^8$-A-nor-5$\beta$-pregnene-3,20-dione-21-ol 21-acetate

A solution of 100 mg. of pure 3-isopropylidene-21-hydroxy-114-methyl-$\Delta^{8,20(22),23}$-A-norcholestatriene (C, III) in 10 ml. of methylene chloride containing 50 mg. of pyridine (2.7 M equivalents) is cooled to —60° and ozonized with a stream containing 1.29 mmoles per liter of gas. The breakthrough in the KI trap following the ozonizing vessel occurs at 3 milliequivalents of ozone.

The crude product is decomposed with zinc dust and a few drops of glacial acetic acid. The test for peroxide is negative after 30 minutes and the organic phase is filtered and washed with water and saturated with sodium chloride solution. After drying over anhydrous sodium sulfate and evaporation of the solvent, the residual product (80 mg.) is dissolved in 2 ml. of pyridine containing 0.5 ml. of acetic anhydride and allowed to stand at room temperature overnight. The oil resulting on evaporation of the reagents is subjected to thin layer chromatography on silica gel and on acid washed alumina (activity V). In addition to numerous tetrazolium-negative spots, one tetrazolium-positive area moving slightly faster than DOCA with 1:3 chloroform-benzene is observed. On elution 7 mg. are isolated (M.P. 105–170°) which have an IR spectrum and mobility essentially identical with those of authentic 21-acetoxy-14-methyl-$\Delta^8$-A-nor-5$\beta$-pregnene-3,20-dione prepared by the route described in our copending application Ser. No. 288,920, filed June 19, 1963.

EXAMPLE 8

Treating the 16-acetoxy or 16-hydroxy starting materials in accordance with the procedure set forth in Examples 1 through 7 yields the corresponding 16-substituted derivative of the compounds of those examples.

EXAMPLE 9

Similarly, treating the 15-acetoxy or 15-hydroxy starting materials in accordance with the procedure set forth in Examples 1 through 7 yields the correspondng 15-substituted derivative of the compounds of those examples.

The invention may be variously otherwise embodied within the scope of the appended claims.

What is claimed is:

1. A compound selected from the group consisting of steroids of the formulae

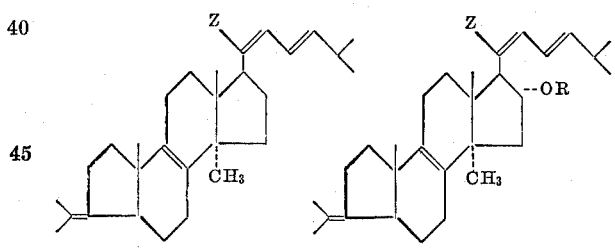

and

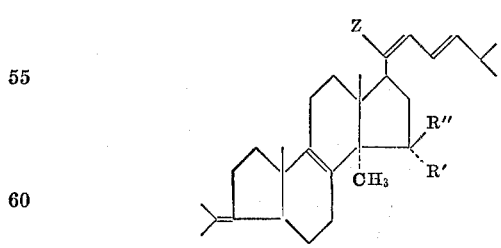

wherein Z is selected from the group consisting of —$CH_2OH$ and COOB, wherein B is selected from the group consisting of hydrogen and lower alkyl; R is selected from the group consisting of hydrogen and acyl; R" is hydrogen; R' is selected from the group consisting of hydroxy and acyloxy; and together R' and R" is oxo (O=) wherein the acyl groups are derived from hydrocarbon carboxylic acids of less than 12 carbon atoms.

2. 3 - isopropylidene - 21 - hydroxy - 14 - methyl-$\Delta^{8,20(22),23}$-A-norcholestatriene.

3. 3 - isopropylidene - 14 - methyl - $\Delta^{8,20(22),23}$ - A-norcholestatriene-21-oic acid.

4. Methyl 3 - isopropylidene - 14 - methyl - $\Delta^{8,20(22),23}$-A-norcholestatriene-21-oate.

5. 14 methyl - $\Delta^8$ - A - nor - $5\beta$ - pregnene - 3,20-dione-21-ol 21-acetate.

References Cited

UNITED STATES PATENTS 3,271,390 9/1966 Fried _____ 260—239.5
3,294,834 12/1966 Fried _____ 260—468

FOREIGN PATENTS 629,538 3/1963 Belgium.

LORRAINE A. WEINBERGER, Primary Examiner

P. J. KILLOS, Assistant Examiner

U.S. Cl. X.R.

260—586, 488, 514, 343.5, 617, 999, 476, 486